US008950375B2

(12) United States Patent
Grahle et al.

(10) Patent No.: US 8,950,375 B2
(45) **Date of Patent: *Feb. 10, 2015**

(54) PISTON FOR AN INTERNAL COMBUSTION ENGINE

(75) Inventors: Peter Grahle, Riedholz (CH); Wilfried Sander, Neckarsulm (DE); Joachim Schulz, Stuttgart (DE); Andreas Seeger-Van Nie, Winterbach (DE)

(73) Assignee: Mahle International GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,324

(22) Filed: Oct. 11, 2011

(65) Prior Publication Data

US 2012/0024255 A1 Feb. 2, 2012

Related U.S. Application Data

(62) Division of application No. 12/315,968, filed on Dec. 8, 2008, now Pat. No. 8,074,617.

(30) Foreign Application Priority Data

Dec. 20, 2007 (DE) ......................... 10 2007 061 601

(51) Int. Cl.
*F16J 1/04* (2006.01)

(52) U.S. Cl.
USPC ..................................... 123/193.6; 123/41.35

(58) Field of Classification Search
USPC .............. 123/193.6, 41.35, 669; 92/176, 186, 92/208, 255; 29/888.042
See application file for complete search history.

(56) References Cited

U.S. PATENT DOCUMENTS

| | | | | |
|---|---|---|---|---|
| 3,596,571 | A * | 8/1971 | Hill et al. | 92/222 |
| 3,613,521 | A | 10/1971 | Itano | |
| 4,334,507 | A | 6/1982 | Kohnert et al. | |
| 4,593,660 | A | 6/1986 | Elsbett et al. | |
| 4,862,865 | A * | 9/1989 | Dahlen et al. | 123/669 |
| 5,097,807 | A * | 3/1992 | Oikawa et al. | 123/276 |
| 5,146,883 | A * | 9/1992 | Reipert et al. | 123/193.6 |
| 5,207,147 | A | 5/1993 | Leites et al. | |
| 5,245,752 | A | 9/1993 | Lippai et al. | |
| 5,309,818 | A | 5/1994 | Mendes et al. | |
| 5,317,958 | A | 6/1994 | Martins Leites et al. | |
| 6,112,642 | A | 9/2000 | Jarrett et al. | |
| 6,698,391 | B1 * | 3/2004 | Kemnitz | 123/193.6 |
| 8,074,617 | B2 * | 12/2011 | Grahle et al. | 123/193.6 |
| 8,225,765 | B2 * | 7/2012 | Kortas et al. | 123/193.6 |
| 2003/0167918 | A1 * | 9/2003 | Kemnitz et al. | 92/186 |
| 2006/0225568 | A1 * | 10/2006 | Ullrich | 92/186 |
| 2006/0278180 | A1 | 12/2006 | Scharp | |
| 2007/0137605 | A1 * | 6/2007 | Scharp | 123/193.6 |
| 2007/0235003 | A1 | 10/2007 | Cagney et al. | |

(Continued)

FOREIGN PATENT DOCUMENTS

| | | |
|---|---|---|
| AT | 29 052 | 6/1984 |
| DE | 1 955 903 | 5/1970 |
| DE | 27 30 120 | 1/1979 |
| DE | 30 32 671 | 3/1982 |
| DE | 82 25 318 | 1/1983 |
| DE | 299 329 | 4/1992 |

(Continued)

*Primary Examiner* — M. McMahon
(74) *Attorney, Agent, or Firm* — Rader, Fishman & Grauer PLLC

(57) ABSTRACT

A piston for an internal combustion engine has a lower piston part and an upper piston part disposed on the lower piston part. The upper piston part has a top land that runs around its circumference, and a ring belt that runs around its circumference. At least the upper piston part consists of a sintered material.

16 Claims, 2 Drawing Sheets

(56) References Cited

U.S. PATENT DOCUMENTS

| | | | | |
|---|---|---|---|---|
| 2007/0283917 | A1* | 12/2007 | Lapp et al. | 123/193.6 |
| 2007/0289568 | A1* | 12/2007 | Scharp et al. | 123/193.6 |
| 2007/0295299 | A1 | 12/2007 | Lapp et al. | |
| 2008/0121102 | A1* | 5/2008 | Scharp et al. | 92/208 |
| 2008/0134880 | A1* | 6/2008 | Lapp et al. | 92/255 |
| 2010/0107999 | A1* | 5/2010 | Scharp et al. | 123/41.35 |
| 2010/0108016 | A1* | 5/2010 | Scharp et al. | 123/193.6 |
| 2010/0108017 | A1* | 5/2010 | Bing et al. | 123/193.6 |
| 2013/0008404 | A1* | 1/2013 | Boczek et al. | 123/193.6 |

FOREIGN PATENT DOCUMENTS

| | | |
|---|---|---|
| DE | 689 14 179 | 11/1994 |
| DE | 691 12 314 | 4/1996 |
| DE | 101 28 737 | 1/2003 |
| DE | 103 40 292 | 4/2005 |
| DE | 10 2004 005 799 | 9/2005 |
| DE | 699 26 583 | 1/2006 |
| GB | 2 216 227 | 10/1989 |
| JP | 56096133 A * | 8/1981 |

* cited by examiner

PISTON FOR AN INTERNAL COMBUSTION ENGINE

CROSS REFERENCE TO RELATED APPLICATIONS

This is a divisional under 35 U.S.C. §120 of U.S. patent application Ser. No. 12/315,968, filed on Dec. 8, 2008. Applicants also claim priority under 35 U.S.C. §119 of German Application No. 10 2007 061 601.7 filed Dec. 20, 2007.

BACKGROUND OF THE INVENTION

1. Field of the Invention

The present invention relates to a piston for an internal combustion engine, having a lower piston part and an upper piston part disposed on the lower piston part, which has a top land that runs around its circumference, and a ring belt that runs around its circumference.

2. The Prior Art

German Patent Application No. DE 103 40 292 A1 describes a piston having an essentially cylindrical basic body that has a ring element in the radially outer region of the piston crown, which element forms a cooling channel together with the basic body. The ring element accommodates a ring insert for a compression ring.

Because of the many different demands on pistons for modern internal combustion engines, new production methods are sought, with which pistons having a variable structure, and which are adapted as well as possible to the requirements in engine operation, can be obtained with the least possible effort.

SUMMARY OF THE INVENTION

The solution consists in a piston according to the invention, in which at least the upper piston part consists of a sintered material. In the method according to the invention, at least the upper piston part is produced by means of pressing and sintering, the lower piston part is produced by means of pressing and sintering or casting or recasting, and the lower piston part and the upper piston part are joined together by means of a solder material.

Therefore, with the piston according to the invention, the screw connection between the upper piston part and lower piston part is eliminated. The configuration of at least the upper piston part as a sintered component makes it possible to make the structures and properties of the piston according to the invention, such as weight, construction height, cooling, etc., for example, significantly more variable than before. In particular, powdered sintered materials having a composition that can be chosen as desired can be used which are pressed to produce a molded part and then sintered to produce the finished upper piston part, or to produce the finished upper piston parts and lower piston parts. In this manner, extremely varied microstructure structures can be implemented, in a particularly simple manner, for example from ferritic to austenitic states and mixtures of them (duplex). The method according to the invention is furthermore characterized by particular economic efficiency.

In a preferred embodiment, the upper piston part is produced from a forged or cast material, particularly a steel material, while the lower piston part is preferably produced from a sintered steel material. Such materials have particularly great thermal resistance, which is particularly advantageous for use in diesel engines. The sintered material of the upper piston part and, if applicable, a sintered lower piston part, can be infiltrated with a metallic material in order to increase its heat conductivity. In this way, heat conduction out of the piston is improved, and the component temperature is lowered.

A particularly preferred further development provides that the lower piston part and the upper piston part are connected with one another by a solder material. In this connection, the solder material penetrates both into the interstices between the lower piston part and the upper piston part, and into the pores, at least of the sintered upper piston part, by means of the capillary effect. In this way, a particularly strong connection, able to withstand great mechanical stress, is produced between the lower piston part and the upper piston part. Particularly suitable solder materials are, for example, copper, copper alloys, nickel, or nickel alloys. To optimize the connection between lower piston part and upper piston part, inner and outer joining surfaces that correspond to one another are preferably provided. It is practical if the solder material is provided in the region of the joining surfaces.

In a particularly practical manner, the sintered material used in an individual case can be infiltrated with the solder material. In this connection, sintering of the sintered material and joining of lower piston part and upper piston part can take place in a single production step. It can be practical, particularly in the case of different capillary effects of the pores of the sintered material, on the one hand, and the interstices between lower piston part and upper piston part, on the other hand, to use a metallic material whose melting temperature is lower than the melting temperature of the solder material to infiltrate the sintered material, in order to ensure reliable and complete infiltration of the sintered material. Infiltration of the sintered material and joining of upper piston part and lower piston part then take place at different temperatures during heating.

The piston crown can be provided with a combustion bowl that is configured as desired, depending on the engine design, in known manner. This combustion bowl can be formed either only by the upper piston part or by both the upper piston part and the lower piston part, depending on the requirements of the individual case.

To improve the cooling effect, the upper piston part and the lower piston part can enclose an outer circumferential cooling channel. In addition, an inner cooling chamber or an inner circumferential cooling channel can be provided. Conducting heat away then takes place out of the piston, particularly out of the piston crown region, in the direction of the cooling channel or cooling channels.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
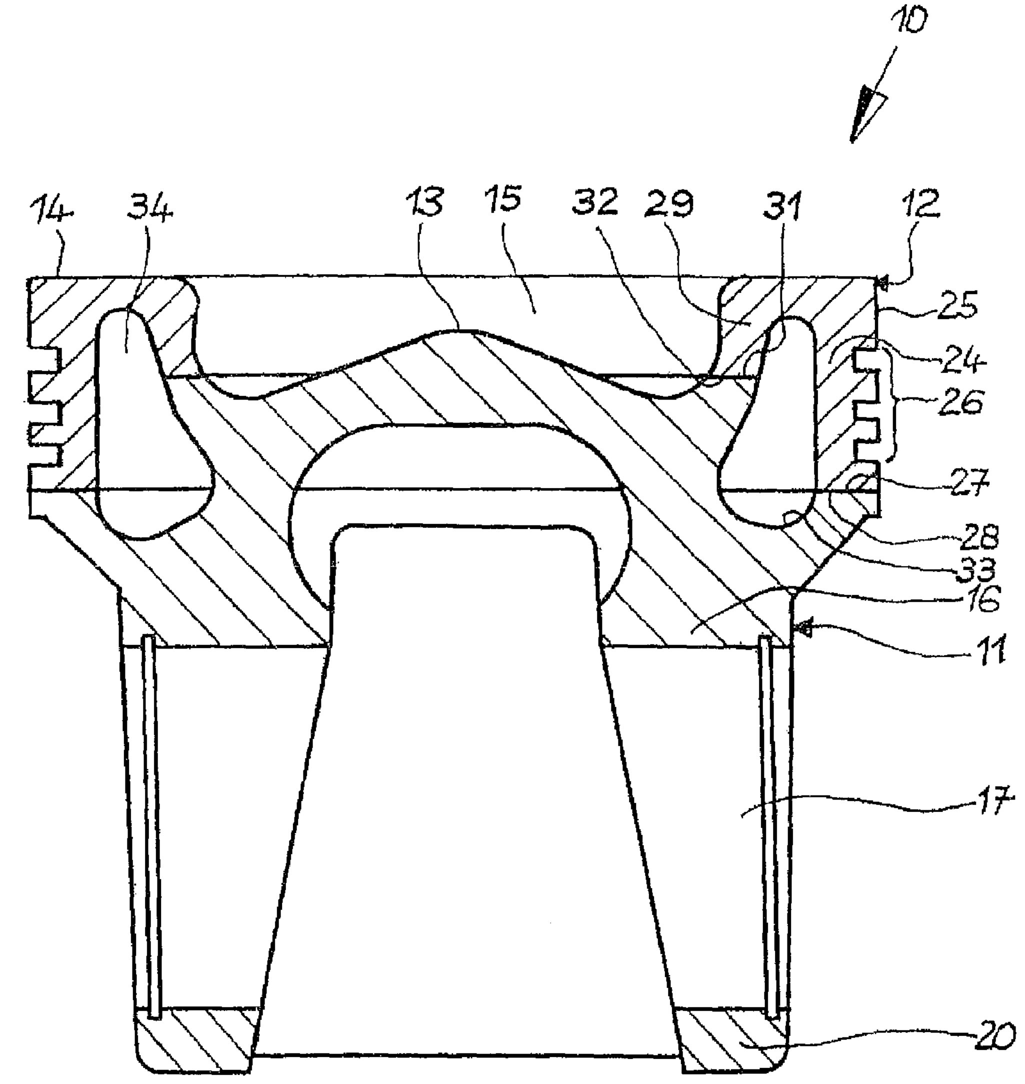
FIG. 1 shows a first embodiment of a piston according to the invention, in section.

Referring now in detail to the drawings, FIG. 1 shows a first embodiment of a piston 10 according to the invention. Piston 10 has a lower piston part 11, which is produced from a forged or cast metallic material. For example, forging steels such as AFP steels, for example 38MnVS6, or annealing steels such as 42CrMo4, for example, are suitable. Piston 10 furthermore has an upper piston part 12, which is produced from a sintered material, particularly a sintered steel material. For example, alloys of iron and carbon or alloys of iron, carbon, and molybdenum are suitable. Using these alloys, it is particularly possible to produce ferritic microstructure structures. The carbon content is preferably 0.4-0.8%, the molybdenum content is preferably 0.0-2.0%, particularly 0.8-1.6%.

The lower piston part 11 has a piston skirt 20 as well as a central or inner region 13 of a piston crown 14, which is provided, in known manner, with a combustion bowl 15. Below piston crown 14, pin bosses 16 are provided, which are provided with pin bores 17 for allowing a piston pin, not shown, to pass through.

Upper piston part 12 has a circumferential, essentially cylindrical ring element 24, which is provided on its mantle surface, in known manner, with a top land 25 and a ring belt 26 having multiple ring grooves for accommodating piston rings, not shown. The lower, free end of ring element 24 forms an outer joining surface 27, which supports itself on a corresponding joining surface 28 of lower piston part 11.

Ring element 24 furthermore has a circumferential edge 29 that extends radially inward, which forms outer ring-shaped region of piston crown 14. The lower free end of edge 29 is formed by an inner joining surface 31, which supports itself on a corresponding joining surface 32 of lower piston part 11.

Lower piston part 11 and upper piston part 12 are joined together by means of a solder material that is provided along joining surfaces 27, 28 or 31, 32, respectively. Copper or copper alloys, or nickel or nickel alloys, are suitable, for example. The melting point of the solder material is lower than the melting point of the material of lower piston part 11 and lower than the melting point of the material of upper piston part 12. At the same time, the melting point of the solder material is higher than the maximal operating temperature that occurs at piston 10.

Ring element 24 as well as circumferential edge 29 of upper piston part 12, or a circumferential recess 33 made in lower piston part 11, respectively, form an outer circumferential cooling channel 34.

Figure 2:
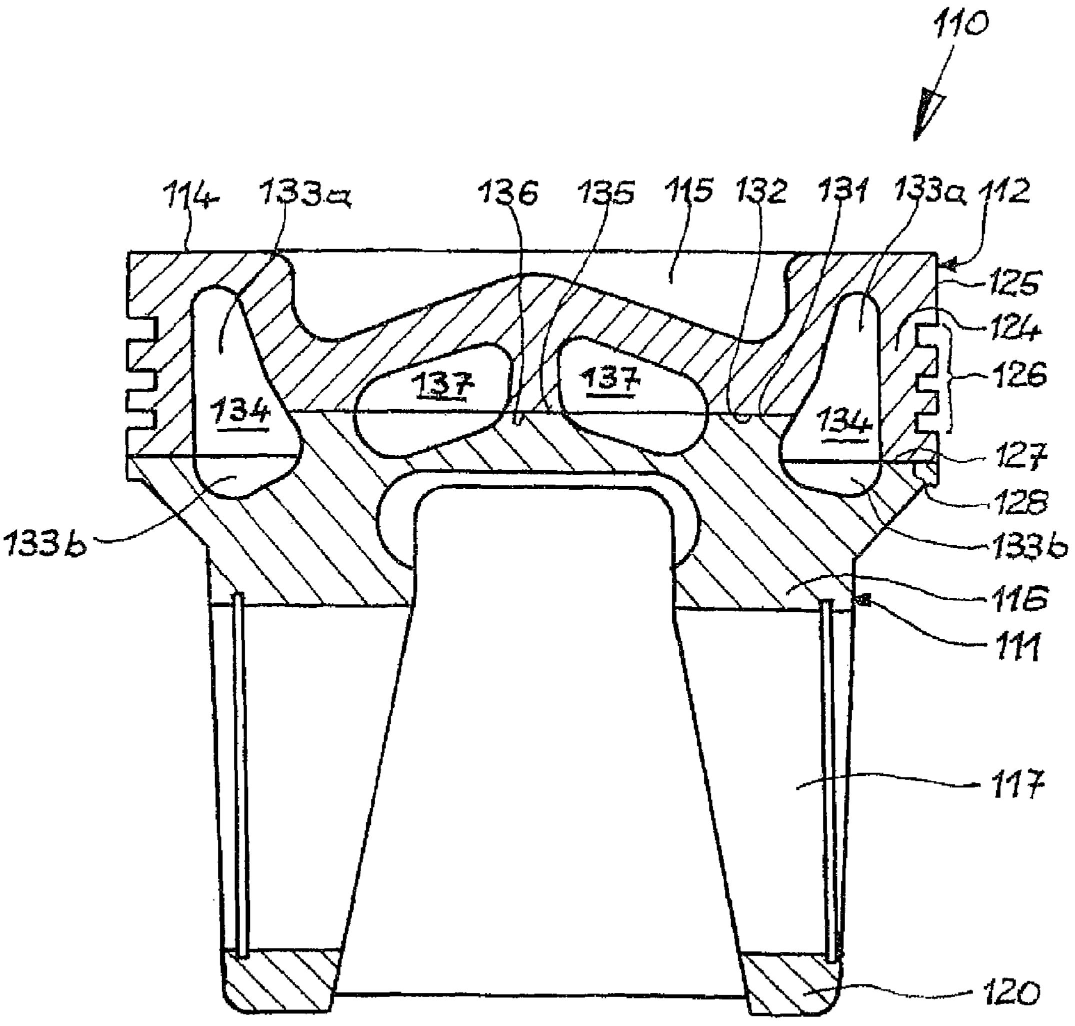
FIG. 2 shows another embodiment of a piston according to the invention, in section.

FIG. 2 shows another exemplary embodiment of a piston 110 according to the invention. Piston 110 has a lower piston part 111 that consists of the same material as lower piston part 11 of piston 10 from FIG. 1. Piston 110 furthermore has an upper piston part 112 that also consists of the same material as upper piston part 12 of piston 10 from FIG. 1. Lower piston part 111 furthermore also has a piston skirt 120 as well as pin bosses 116 provided with pin bores 117.

Upper piston part 112 has a piston crown 114 that is provided, in known manner, with a combustion bowl 115. In this embodiment, combustion bowl 115 is formed solely in the upper piston part 112. Piston crown 114 is delimited by a circumferential, essentially cylindrical ring element 124. On its mantle surface, ring element 124 is provided, in known manner, with a top land 125 and a ring belt 126 having multiple ring grooves for accommodating piston rings, not shown. The lower free end of ring element 124 forms a joining surface 127, which supports itself on a corresponding joining surface 128 of lower piston part 111.

Upper piston part 112 has two additional joining surfaces below combustion bowl 115. For one thing, an inner circumferential joining surface 131 is provided, which supports itself on a corresponding inner circumferential joining surface 132 of lower piston part 11. Furthermore, a central joining surface 135 is provided, which supports itself on a corresponding joining surface 136 of lower piston part 111.

Lower piston part 111 and upper piston part 112 are joined together by means of a solder material that is provided along joining surfaces 127, 128 or 131, 132, respectively, as well as 135, 136. For example, copper or copper alloys, or nickel or nickel alloys are suitable. The melting point of the solder material is lower than the melting point of the material of lower piston part 111 and lower than the melting point of the material of upper piston part 112. At the same time, the melting point of the solder material is higher than the maximal operating temperature that occurs at piston 110.

A circumferential recess 133*a* provided in upper piston part 112, between ring element 124 and combustion bowl 115, and a corresponding circumferential recess 113*b* provided in lower piston part 111, respectively, form an outer circumferential cooling channel 134. Furthermore, an inner circumferential cooling channel 137 is configured between inner circumferential joining surfaces 131, 132 and central joining surfaces 135, 136. If joining surfaces 135, 136 are omitted, a central cooling chamber (not shown) is formed instead of the inner circumferential cooling channel.

To assemble piston 10, 110 according to the invention, lower piston part 11, 111 and upper piston part 12, 112 are joined together by means of the solder material, in known manner. For this purpose, the solder material is brought into contact with the joining surfaces and heated, together with lower piston part 11, 111 and upper piston part 12, 112, until the solder material melts. In this connection, because of the capillary effect, the solder material penetrates both into the interstices between the joining surfaces, and into the pores of the sintered material of upper piston part 12, 112 or the sintered materials of the two parts of piston 10, 110, respectively. In this connection, sintering of at least upper piston part 12, 112 and joining of lower piston part 11, 111 and upper piston part 12, 112 can take place in one and the same production step, for example during the same oven pass. First, the powdered material is pressed into molded parts that have only a low strength. These parts result in upper piston part 12, 112 or the two components 10, 110. This pressing precedes the combined sintering and joining process here. This results in a particularly cost-advantageous production method for piston 10, 110 according to the invention.

After cooling, a firm connection between lower piston part 11, 111 and upper piston part 12, 112 is obtained, which is able to withstand great mechanical stress.

Accordingly, while only a few embodiments of the present invention have been shown and described, it is obvious that many changes and modifications may be made thereunto without departing from the spirit and scope of the invention.

What is claimed is:

1. A piston for an internal combustion engine, comprising:

a lower piston part; and an upper piston part connected to the lower piston part, said upper piston part having a top land that runs around its circumference and a ring belt that runs around its circumference, wherein the lower piston part and the upper piston part cooperate to enclose an outer circumferential cooling channel;

wherein the lower piston part and the upper piston part have inner and outer joining surfaces that correspond to one another, the inner joining surfaces of the lower and upper piston parts disposed on an opposite side of the outer circumferential cooling channel from the outer joining surfaces of the lower and upper piston parts;

wherein at least the upper piston part comprises a sintered material; and wherein the lower piston part and the upper piston part are connected with one another by means of a solder material, and wherein the sintered material is infiltrated by the solder material.

2. The piston according to claim 1, wherein the lower piston part includes one of a forged and a cast material.

3. The piston according to claim 2, wherein the upper piston part includes a sintered steel material.

4. The piston according to claim 1, wherein the solder material is made of copper, copper alloy, nickel or nickel alloy.

5. The piston according to claim 1, wherein the lower piston part and the upper piston part are joined together with one another by means of a solder material disposed in a region of the joining surfaces.

6. The piston according to claim 1, wherein the piston has a combustion bowl.

7. The piston according to claim 6, wherein the combustion bowl is formed both by the lower piston part and by the upper piston part.

8. The piston according to claim 6, wherein the combustion bowl is formed in the upper piston part.

9. The piston according to claim 1, wherein the lower piston part and the upper piston part enclose an inner cooling chamber or an inner circumferential cooling channel.

10. The piston according to claim 7, wherein the upper piston part defines a radially outer portion of the combustion bowl, and the lower piston part defines a radially inner portion of the combustion bowl.

11. The piston according to claim 1, wherein the outer circumferential cooling channel is defined in part by a circumferential recess in the lower piston part.

12. The piston according to claim 1, wherein the inner joining surfaces of the lower and upper piston parts are spaced away from the outer joining surfaces of the lower and upper piston parts in a vertical direction with respect to the piston.

13. The piston according to claim 1, wherein the combustion bowl defines a centrally positioned region spaced away from the inner joining surfaces of the lower and upper piston parts in a vertical direction with respect to the piston.

14. The piston according to claim 1, wherein the upper piston part is formed of a different material than the lower piston part.

15. The piston according to claim 14, wherein the lower piston part is formed of a steel material.

16. The piston according to claim 1, wherein the lower piston part is formed of a steel material.

* * * * *